June 21, 1932. G. ZOTOS 1,863,708
PROCESS OF AND MEANS FOR MELTING GLASS AND THE LIKE
Filed Nov. 2, 1928
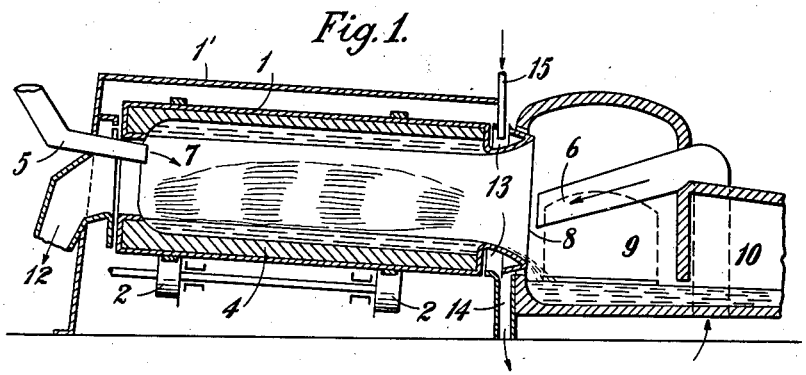
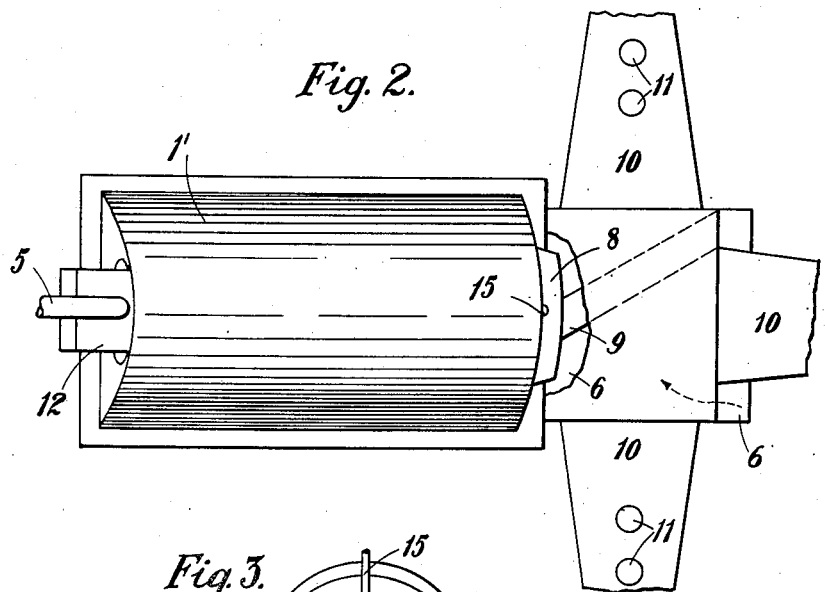
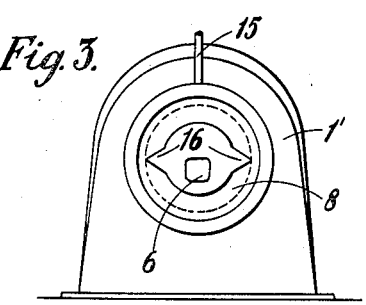

Patented June 21, 1932

1,863,708

UNITED STATES PATENT OFFICE

GEORG ZOTOS, OF BERLIN, GERMANY

PROCESS OF AND MEANS FOR MELTING GLASS AND THE LIKE

Application filed November 2, 1928, Serial No. 316,749, and in Switzerland November 15, 1927.

This invention relates to a process and an apparatus for melting glass, silicates and mineral substances by means of a rotary furnace. The subject matter of the invention is suitable for carrying out any melting operation but its employment is especially advantageous in the manufacture of glass of all kinds.

As the employment of the invention in connection with glass manufacture is technically the most troublesome as compared with its employment in connection with other substances, the invention will be described with reference to glass and all its applications to other substances will be readily understood.

According to the invention, the raw materials forming the glass composition are fed into a continually rapidly rotating drum lined with refractory material, the materials fed in are melted and brought to the refined condition by means of a flame—e. g., a gas, oil or coal dust flame—and molten glass is continually withdrawn from the inner layer of the hollow cylinder of liquid glass that is formed and, further, to keep the temperature of the interior of the furnace as high as possible without injuring the drum, the latter is cooled by means of a current of air and the waste heat carried away by the current of air is made utilizable for the melting operation and other purposes in the manufacture.

The apparatus for carrying out this process comprises a rotary drum with a refractory lining, means for driving the drum rapidly and continually, means for feeding the raw materials forming the glass composition continually into the drum, firing means for melting the raw materials, an outlet for the molten glass, and means for receiving the molten glass issuing from the outlet.

An example of apparatus for carrying out the process according to the invention is diagrammatically represented by the accompanying drawing of which:

Fig. 1 is a vertical section through the apparatus;

Fig. 2 is a plan corresponding to Fig. 1; and

Fig. 3 is a view of the outlet of the drum furnace.

A metallic drum 1 has a casing 1' of a suitable material, is rotatably mounted in the known manner on rollers 2 and can, by driving one or more of these rollers, be set into rapid and continuous rotation. The drum is furnished with a refractory lining 4. The raw materials forming the glass composition are fed continually into the interior of the furnace by a feeding device—e. g., a worm 5—and are fused by the flame of a gas burner 6. The molten mass of glass is spread into the form of a hollow cylinder 7 and molten material continually flows from the inner layer of the hollow cylinder 7 through an outlet 8 of the furnace. The outlet 8 consists of a funnel-shaped drum extension which opens with its flared mouth into a central trough 9 which receives the molten and refined glass. Continuations 10 are connected to the trough 9 and from these continuations glass machines, for example, can remove the fluid glass directly at 11. In order to be able to raise the temperature of the interior of the furnace as far as possible and thus to effect a rapid fusion and thorough refining without injuring the drum by overheating it, a current of cooling air is passed into the annular space formed between the drum 1 and the casing 1' and this cooling air which has taken up the waste heat of the drum, is led off and rendered utilizable as combustion air in the melting process or for other purposes in the manufacture of glass. The gases of combustion of the furnace are led away at 12.

An open cooling space 13 is provided around the neck of the outlet funnel 8 for the purpose of protecting the material of which the funnel is made against the destructive influence of the issuing fluid glass. On account of this cooling space a layer of solidified glass is deposited on the inner wall of the funnel and this layer is continually maintained and affords the desired protection. The cooling air is passed into the space 13 through a pipe 14 and passes out through a pipe 15. The funnel 8 has in its cross-section at least one radial recess 16 (Fig. 3) for the purpose of concentrating the outflow of the fluid glass at definite places.

The central trough 9 has an arched roof and is preferably so constructed that the fluid glass issuing from the outlet funnel 8 is unable to destroy the walls or the arch of the trough.

The velocity of the drum should be only high enough to maintain the molten mass in a cylindrical form against the drum wall. A speed of between 70–120 R. P. M. is sufficient for this purpose. At this speed the discharge from the funnel 8 will be principally confined to the recesses 16 whence the glass will issue in two thick jets which, although they may receive a radial impetus on leaving the outlet funnel, will remain within the trough space and flow to the bottom of the trough. By arranging the drum in an inclined position as shown in Fig. 1, the jets are prevented from winding themselves about the outlet funnel. It is also possible to suck the glass from the drum by means of cooled suction pipes.

There are various possibilities for efficiently utilizing the waste heat taken up by the currents of cooling air from the annular space between the drum 1 and the casing 1'. There may be provided a heat interchanging device through which part of the gases of combustion escaping from the furnace is passed (whilst part of the gases of combustion may be passed into annealing furnaces) and in which a portion of the aforesaid warm cooling air can then be further preheated to be passed into the furnace as primary combustion air whilst secondary air can be sucked into the drum from the space 9 by the injector action of the burner 6. This action is promoted by using a portion of the warm cooling air for the regenerative cooling of the very hot glass issuing from the furnace at 9 with the result that this air, utilizing the superheat in the mass of glass which would otherwise be lost, becomes highly heated before being caused by the aforesaid suction action to arrive in the furnace as secondary combustion air. A portion of the excess of cooling air coming from the annular space can be employed in gas generators for producing the combustion gas for firing the furnace.

The, or each, burner is advantageously arranged with its axis eccentric or inclined to the axis of the furnace. In order to protect the head of the burner from being burnt, it is advantageous to cause the combustion gases or air to issue from the opening with such a high velocity that the ignition of the gases takes place only within the furnace at a certain distance from the burner opening.

The furnace drum is advantageously readily exchangeable so that there will be no prolonged interruption of working on renewing the refractory lining but the drum will be replaced by another which has been newly lined and repaired.

The casing surrounding the drum 1 could also be cylindrical and rotate together with the drum, suitable measures being taken for admitting and leading away the cooling air.

In the apparatus described the feeding and discharge of the material is effected through the two ends of the furnace respectively. Charging can, however, be effected at the end of the furnace through which the molten glass issues.

The term "glass" used in the claims covers, in addition to glass, other silicates and mineral substances that are intended to be subjected to a fusion operation.

I claim:

1. A process for melting glass by means of a rotary furnace, comprising continually feeding into a drum lined with refractory material the raw materials forming the glass composition, melting said raw materials by means of a flame, rotating the drum so as to form a hollow cylinder of fluid glass on the inner surface thereof, and withdrawing molten glass from the inner layer of said hollow cylinder of fluid glass.

2. A process according to claim 1, comprising cooling the drum by a current of air, for the purpose of enabling the temperature within the drum to be as high as possible without injuring the drum, and utilizing the waste heat carried away by the current of air for the melting process and other purposes in the manufacture.

3. A process for melting glass by means of a rotary furnace, comprising continually feeding into a drum lined with refractory material the raw materials forming the glass composition, melting said raw materials by heating gas that is caused to issue from burner apparatus with such a velocity that the ignition of said gas takes place only at a certain distance from said burner apparatus, rotating the drum so as to form a hollow cylinder of fluid glass on the inner surface thereof, and withdrawing molten glass from the inner layer of said hollow cylinder of fluid glass.

4. An apparatus for melting glass comprising an open-ended drum lined with refractory material, rollers supporting the drum so as to enable it to be rotated about its axis, means for feeding the raw materials into the drum at one end thereof, means for introducing a melting flame into the drum from the other end thereof, an outwardly flared funnel-shaped extension at said latter end of the drum for the delivery of the molten glass, and a chamber surrounding said flame-introducing means and adjoining said funnel-shaped extension for the reception of the molten glass.

5. The apparatus claimed in claim 4 in combination with a stationary casing enclosing the drum, and pipes opening into said casing close to the funnel-shaped extension for supplying and withdrawing cooling air thereto.

6. An apparatus as claimed in claim 4 wherein the flame introducing means consists of a burner pipe arranged in an oblique direction relative to the axis of the drum.

7. An apparatus as claimed in claim 4 wherein the funnel-shaped extension is formed with recesses wherein the outflow of molten glass is concentrated.

8. Apparatus for melting glass by means of a rotary furnace, comprising a rotary drum with a refractory lining, means for rapidly and continually driving said drum, feeding means for continually feeding said drum with raw materials forming the glass composition, firing means for melting said raw materials, an outlet with one or more radial recesses for the purpose of concentrating thereat the flow from the whole circumference, and means for receiving the molten glass issuing from said outlet.

GEORG ZOTOS.